United States Patent [19]
Nordal et al.

[11] Patent Number: 6,031,970
[45] Date of Patent: Feb. 29, 2000

[54] INFARED EMITTER AND METHODS FOR FABRICATING THE SAME

[75] Inventors: Per-Erik Nordal, Nesbru, Norway; Terje Skotheim, Tucson, Ariz.

[73] Assignee: Patinor A/S, Oslo, Norway

[21] Appl. No.: 09/029,836

[22] PCT Filed: Sep. 6, 1996

[86] PCT No.: PCT/NO96/00216
§ 371 Date: Jul. 1, 1998
§ 102(e) Date: Jul. 1, 1998

[87] PCT Pub. No.: WO97/09593
PCT Pub. Date: Mar. 13, 1997

[30] Foreign Application Priority Data

Sep. 8, 1995 [NO] Norway ..................................... 95 3534

[51] Int. Cl.[7] ....................................................... H05B 3/00
[52] U.S. Cl. ........................ 392/407; 219/553; 250/504 R
[58] Field of Search ............................ 392/407; 219/553, 219/543; 250/504 R; 428/408

[56] References Cited

U.S. PATENT DOCUMENTS

| | | |
|---|---|---|
| 3,961,155 | 6/1976 | Weldon et al. ........................ 219/543 |
| 5,128,514 | 7/1992 | Lehmann et al. . |
| 5,352,493 | 10/1994 | Dorfman et al. . |
| 5,488,350 | 1/1996 | Aslam et al. ........................... 219/553 |
| 5,705,272 | 1/1998 | Taniguchi ............................... 219/553 |

FOREIGN PATENT DOCUMENTS

| | | |
|---|---|---|
| 503 934 | 9/1992 | European Pat. Off. . |
| 533 211 | 3/1993 | European Pat. Off. . |
| 588 449 | 3/1994 | European Pat. Off. . |
| 632 344 | 1/1995 | European Pat. Off. . |
| 64-56401 | 3/1989 | Japan . |
| 6-348154 | 12/1994 | Japan . |
| 149679 | 2/1984 | Norway . |
| WO 90/14580 | 11/1990 | WIPO . |

*Primary Examiner*—John A. Jeffery
*Attorney, Agent, or Firm*—Browdy and Neimark

[57] ABSTRACT

An infrared radiation source for sensor and spectroscopic use has a thin, electrically conducting film adapted to emit infrared radiation when heated. The film is formed from a gas or vapor phase and includes a network of diamond-like carbon. Depending on the percentage of metal atoms in the film, the film may have metal atoms which are either distributed in the diamond-like carbon network or else form an additional metallic network. The metal may be tungsten, chromium, or titanium, and the film may include silicon and oxygen.

25 Claims, 6 Drawing Sheets

INFARED EMITTER AND METHODS FOR FABRICATING THE SAME

FIELD OF THE INVENTION

This invention describes a class of infrared radiation emitters suitable for applications in spectroscopic devices and instruments as well as in thermal printers, etc.

BACKGROUND OF THE INVENTION

There are known emitters where the infrared radiation emanates from a surface which is directly or indirectly heated by an electrical current passing through a conducting layer in or below the surface. The elevated temperature leads to increased emission of radiation, with the intensity and spatial as well as spectral distribution of the emitted radiation depending on the element temperature, as well as on its emissivity and surface topography.

For a greybody with emissivity $\epsilon$, the emitted power per unit area, within a wavelength interval $d\lambda$ at wavelength $\lambda$ is given by:

$$W(\lambda, T)d\lambda = \epsilon \frac{2\pi hc^2}{\lambda^5} \left( e^{\frac{hc}{kT\lambda}} - 1 \right)^{-1} d\lambda \quad (1)$$

where T is the temperature, h is Planck's constant, k is Boltzmann's constant and c is the velocity of light.

In spectroscopic analysis, parts of the emitted power within restricted wavelength regions are selected by means of optical filters, and the radiation source is sought optimized by having a high emissivity $\epsilon$ and high temperature T.

In order to achieve compact, efficient and low-cost device solutions, it is desirable to switch or modulate the emitted radiation by rapidly varying the temperature T of the emitter, rather than by mechanical motion of shutters, filters etc. Electrically switched infrared emitters are also of great interest in many non-spectroscopic applications such as thermal printers, etc.

Two well-known types of pulsed thermal emitters in current use are:

1) Filaments in bulb-like enclosures. The filament is driven by a pulsating current, causing heating/cooling and associated variations in emitted infrared radiation. These sources are used in infrared sensors for gas monitoring, etc, and are relatively cheap. Unfortunately, their operative life is short, requiring frequent replacement. Also, they are bulky and consume much electrical power compared to the useful infrared radiation emitted.

2) Electrically conducting, planar surfaces that are heated by a pulsating electrical current. The surface may be a flat, insulating substrate which is coated by a conducting film or layer, or it may be a thin, freely suspended membrane of a material which is itself electrically conducting.

The former type of emitter is described in Norwegian patent No. 149,679 and U.S. Pat. No. 3,961,155. Drawbacks of these types of emitters include: Poor efficiency (i.e. much electrical power needed compared to the useful radiation emitted), which is in large part due to heat conduction through the relatively thick (typically 0.5 mm) substrate. Also, mechanical mounting and bonding of electrical connections is critical and labor intensive.

The latter type has been implemented in commercial gas sensors, in the form of a silicone membrane which is etched thin and doped to high conductivity in a central region where infrared emission takes place. These sources have proven very robust and long-lived, and are generally more efficient than the emitters referred above, although the heat loss through the membrane to the mounting fixtures is still quite high. This is due to the thicker portions of the membrane, which must have a certain mechanical strength to permit an acceptable yield during manufacturing operations, as well as robustness in practical use. A serious drawback of these emitters is their high manufacturing cost.

The ideal thermal emitter should convert 100% of the dissipated electrical energy into infrared radiation at the desired wavelengths. Membrane emitters described above are a far cry from this; typically the ratio between total radiated power and supplied electrical power is 10% or less. The pulsating part of the radiated power is a fraction of the total emitted power, and the infrared emission within specific spectral bands is a fraction of this.

As shown schematically in FIG. 1, heat is generated in the thin membrane and can take several different paths:

a) Radiation into the space in front and back of the membrane.

Radiation is the heat loss mechanism which is sought maximized at the expense of the following:

b) Conduction through membrane mounts and electrical connectors.

c) Thermal diffusion through gas surrounding the membrane.

d) Convection in gas surrounding membrane.

Each of these can be quantified, subject to defined conditions such as materials, dimensions and operating temperature. Consider, e.g. the membrane shown in FIG. 2, which is freely suspended at opposite ends and surrounded by parallel surfaces representing the floor and the output window in a can filled with air: The different heat loss contributions a) to d) are shown qualitatively in the graph.

As is evident from FIG. 2, and by simple intuitive reasoning, the membrane emitter should have certain basic features:

First, in order to emit much infrared radiation, the membrane temperature and emissivity should both be high, cf. Equation 1). More specifically, the temperature should reach a high peak and a low trough value during each temperature cycle (cf. FIG. 3), to maximize the difference in emitted radiation between the <<power on>> and <<power off>> states. High temperature contrast is obtained by:

Inducing a rapid temperature rise during the application of electrical power to the membrane. This in turn is facilitated by high power dissipation and low heat capacity in the membrane.

Achieving rapid cooling of the membrane during the <<power off>> period. This is achieved by a low heat capacity in the membrane, coupled with high heat loss from the membrane. A high heat loss from the membrane by mechanisms other than a) above, leads too poor efficiency, however.

Summing up, the heat capacity of the membrane should be as low as possible, implying in practice that the membrane should be as thin as is compatible with mechanical strength requirements in the given application (vibrations etc). Furthermore, the surface facing the direction in which the radiation is to be emitted should have a high emissivity at the wavelengths of interest. Total heat transport from the membrane should be minimized, but must be sufficiently high to yield a sufficiently rapid cooling transient during the <<power off>> period. In the limit of an extremely thin membrane with near-zero heat capacity, heat loss by radiation is sufficient to cause a rapid cooling transient, and all other heat loss mechanisms b) to d) should be brought as close to zero as possible.

One notes that a thin membrane is all-critical, since this reduces the need for heat loss by other mechanisms than a), and leads to an efficient device requiring little electrical power. Heat transport along the membrane and to mounting posts/electrical leads is also minimized by using a thin membrane.

Membrane sources with their shortcomings as outlined above represent a compromise between the ideal technical requirements outlined above and the need for physical robustness and manufacturability at acceptable costs.

SUMMARY OF THE INVENTION

According to the present invention there is provided an infrared radiation emitter the claims. A method for manufacturing the i.r. emitter is disclosed by the characterizing part of claim 14. The invention is described in greater detail below, with references given to the accompanying drawings:

BRIEF DESCRIPTION OF THE DRAWINGS FIGURES

FIG. 1: Heat transport paths away from the heated region:
a) Infrared radiation.
b) Conduction through membrane mounts and electrical connectors.
c) Thermal diffusion through gas surrounding the membrane.
d) Convection in gas surrounding the membrane.

FIG. 2: Principle sketch of self-supporting membrane emitter in typical temperature dependence of dominant heat transport mechanisms from membrane.

FIG. 3: Time evolution of applied electrical power and resulting membrane temperatures.

FIG. 4: Stages in the manufacturing of radiation source with self supporting membrane:
a) Membrane substrate ready for deposition of DLC.
b) DLC deposition.
c) Substrate removed.
d) Finished source package.

FIG. 5: Example of surface that is structured to achieve high emissivity.

FIG. 6 a,b,c:
Examples of surfaces that are structured to control spectral (a,b) and polarization (c) properties of emitted radiation.

DETAILED DESCRIPTION OF THE INVENTION

Figure 1:
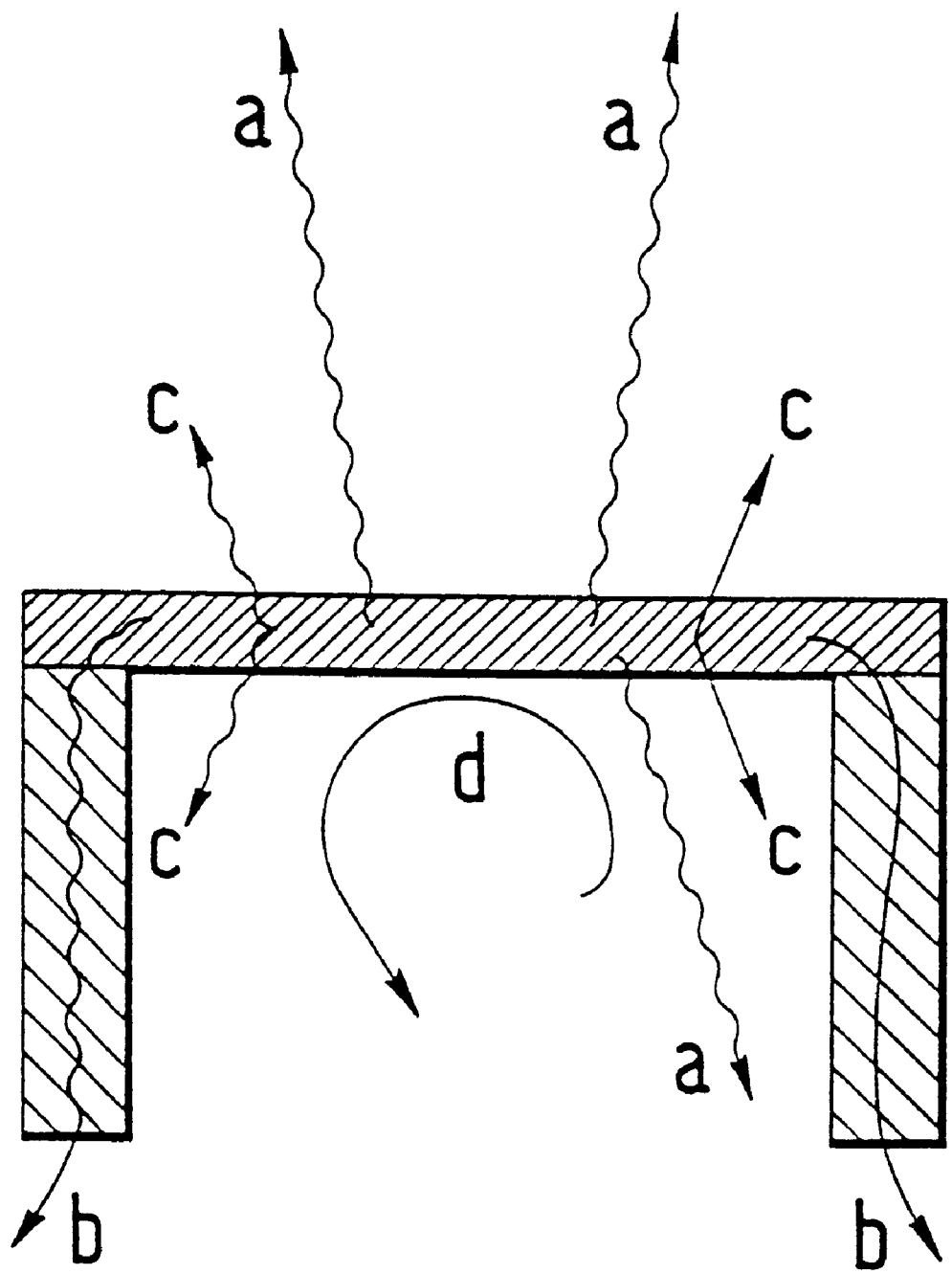
Figure 2B:
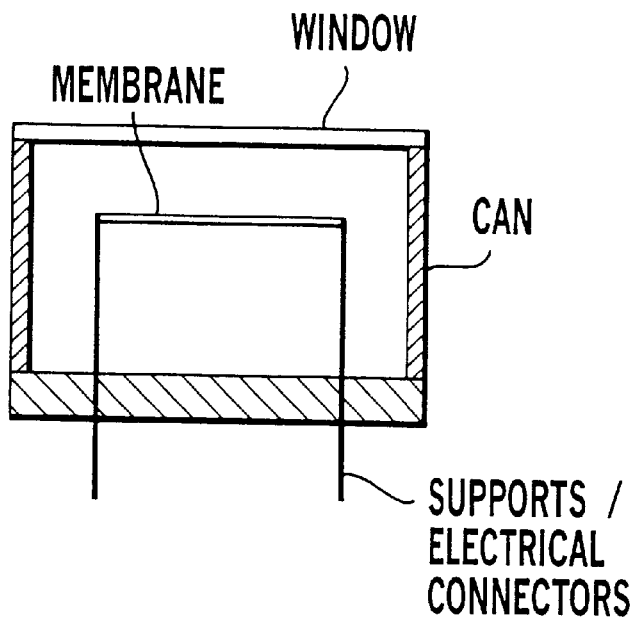
Figure 2A:
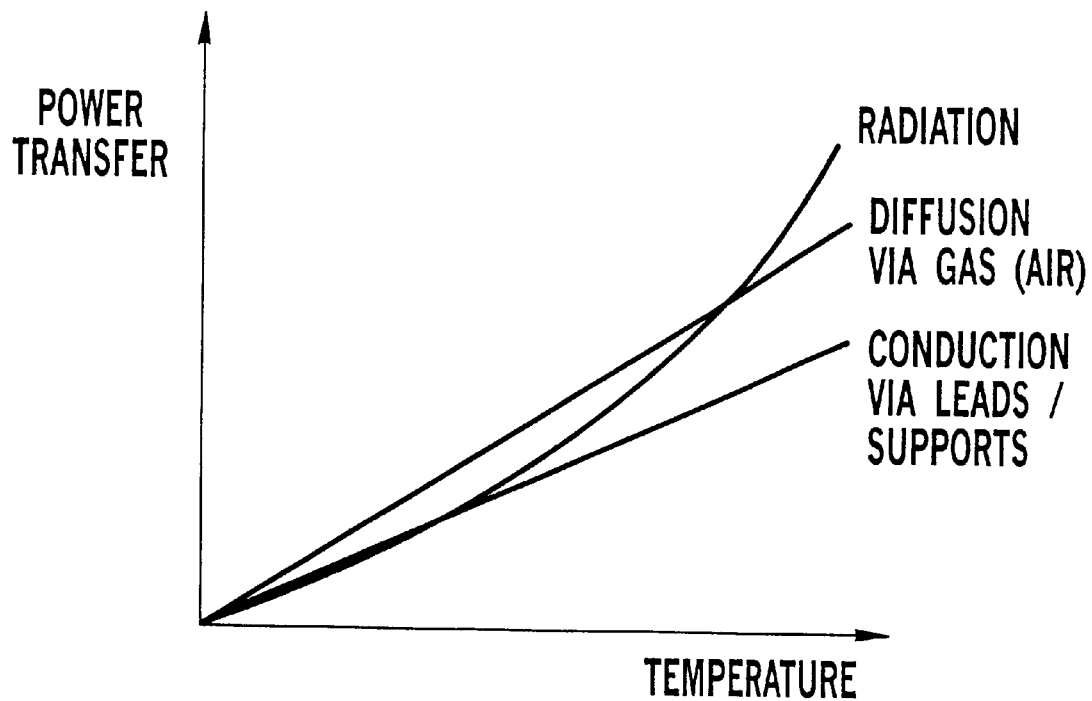
Figure 3:
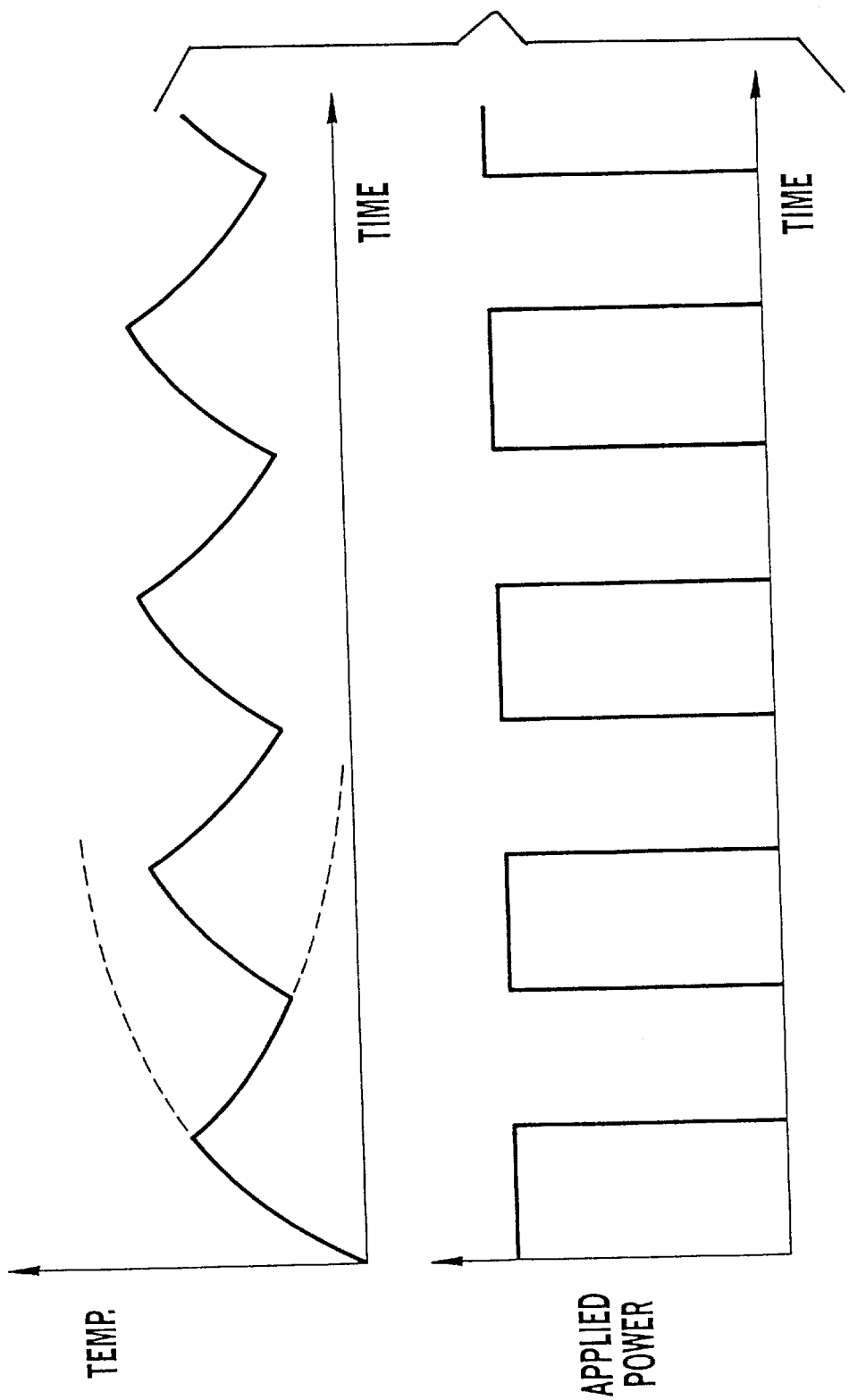
Figure 4A:
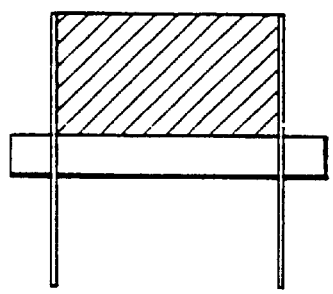
Figure 4B:
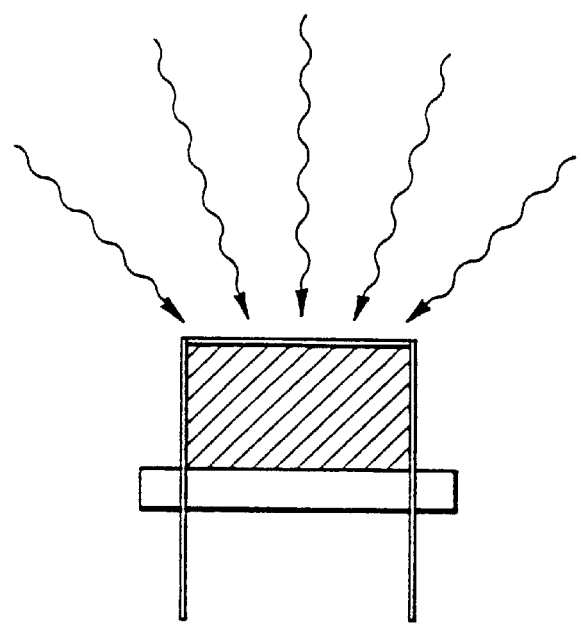
Figure 4C:
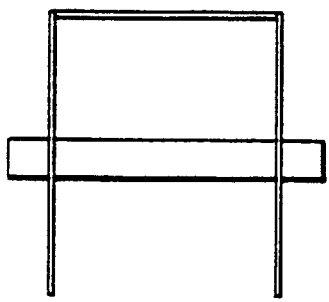
Figure 4D:
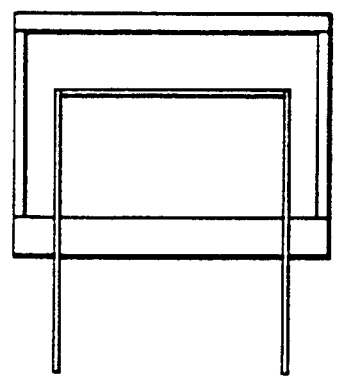

The present invention is based on a thin emitter layer consisting of conducting diamond-like carbon (DLC). Diamond-like carbon materials and some applications are e.g. described in U.S. Pat. No. 5 352 493 (Dorfman et al.) which is hereby incorporated herein in its entirety by reference. Thin, self-supporting membranes are prepared from gas phase by deposition of DLC on a substrate which is subsequently eroded away, leaving the DLC membrane electrically connected and supported by posts previously embedded in the substrate which was removed. This procedure, combined with the extreme mechanical strength of the DLC material, permits ready-mounted membrane emitters to be manufactured with large area-to thickness ratios, in a few and simple manufacturing steps.

Alternatively, a DLC emitter layer is formed on top of a substrate which has low thermal diffusivity, and which remains in place after completion of the DLC deposition process. As in the previous case, electrodes are pre-embedded in the substrate and become electrically connected with the membrane during DLC deposition.

By employing substrates with a microtextured surface, DLC membranes are formed with surface topographies that confer special emission characteristics upon the membrane, i.e.: high emissivity, spectral selectivity and/or emission of polarized radiation.

During recent years, a range of technologies for producing DLC films have been developed. Such Films can be made with physical and chemical properties that are very useful in a vide range of applications. An example of the latter is given in European Patent EP-A-0 588 449, where an electric field effect light emitting device is described, based on an oxygen-containing diamond-like film. The film further comprises metal atoms in order to tune the device to the desired wavelength, e.g. Cr or Fe for the red band. The device shows an excellent moisture resistance, long service life and high luminance. In contrast to the present invention, however, the device is based on short-wavelength (visible) radiation being generated by electroluminescence, whereas the present invention invention describes predominantly infrared emission that is generated thermally.

Of particular interest here are films that:

Are deposited at moderate to low temperatures, and thus can be coated on polymers and other heat-sensitive materials without incurring deformation or damage.

Are electrically conducting. In U.S. Pat. No. 5,352,493 (Dorfman et al.) is described a class of of metal-containing DLC films, termed diamond-like nanocomposites (DLN), that have a number of beneficial properties relative to the present application. Diamond-like nanocomposites consists of interpenetrating networks of predominantly sp3-bonded carbon stabilized by hydrogen, glass-like silicon stabilized by oxygen, and random networks of elements from the 1–7b and 8 groups of the periodic table. Thus, the electrical conductivity can be adjusted continuously over 18 orders of magnitude by varying the concentration of built-in metal atoms. Conductivities as high as 10 000 S/m have been achieved, while preserving the diamond-like nature of the material.

An important consideration is the ability of the membrane to withstand high temperatures and thermal cycling. In an oxygen-containing atmosphere, pure diamond oxidizes at temperatures above 700–750° C., while typical amorphous diamond-like materials deteriorate much more rapidly. The metal-containing DLN films, however, have high-temperature stability comparable to or better than that of crystalline diamond, and exhibit extreme stability during thermal and mechanical cycling. In air, estimated long term stability at 450° C. is more than 10 years, and DLN thermal resistors have withstood 2×10exp8 pulses with maximum temperatures above 750° C., and 10exp6 pulses with maximum temperatures above 1250° C. In an oxygen-free environment, films are stable up to 1000° C. for several hours and up to to 1500° C. for short pulses.

Current commercial membrane emitters based on other technologies typically operate at temperatures up to 650° C., and are enclosed in a sealed can containing an inert atmosphere.

The basic manufacturing steps are sketched in FIG. 4:
a) The base of the can in which the membrane emitter is to be housed is temporarily prepared with a substrate as shown before being exposed to DLC deposition. Here, electrical leads enter the can through its base and end flush with the top of the substrate, where they are shaped so as to define the supporting structure for and the electrode connections to the DLC membrane.

b) The substrate is subjected to DLC deposition. All surfaces that are not to remain coated by the DLC film are either shielded, or coated by a protective layer which resists formation/adhesion of the DLC film. The part of the film that is formed on top of the electrodes becomes electrically connected in the deposition process.

c) The substrate and shielding materials are removed, leaving the membrane suspended and electrically connected.

d) The can is closed and backfilled with inert gas, or evacuated and sealed.

Step c) is critical, in particular the removal of the substrate. The DLC layer is extremely thin and must not be subjected to undue mechanical stress during this process. At the same time, it is desired that removal of the substrate shall be as simple and reliable as possible, and there should be no residue.

A solution according to the present invention is to employ substrates that can be dissolved or gasified by chemical and/or physical processes that do not attack other components in the emitter assembly. This is possible, since there exist DLC deposition processes that do not subject the substrate to high temperatures. This makes a wide field of materials accessible for use as substrates.

As an example, it is known that PMMA depolymerizes at temperatures of 300–350° C. and above, going into a monomer gas phase and leaving no residue. This is below the anticipated operation temperature in most applications, and well below the failure temperatures of DLC materials of interest. PMMA is also attractive as a substrate material, since substrates in this material can be made with a high degree of control, including microtexturing (cf. below).

A number of alternatives exist, where gasification can be effected by thermal and/or chemical means, e.g. ozone erosion of polymers.

The primary reason for removing the substrate to leave a free-standing membrane as described above is to minimize heat loss by thermal diffusion. Given a substrate with the right physical characteristics, however, it might be preferable to let it remain as an integral part of the emitter assembly: Manufacturing would not require the substrate removal step, and the substrate would act as a mechanical support during vibrations, etc.

A substrate that can be left in situ following DLC deposition must fulfil several requirements, including low differential thermal expansion relative to the DLC film, good resistance to thermal degradation, and good adhesion to the DLC film. Particularly important, however, is that it should be a poor heat conductor, such that a high average temperature in the DLC film does not lead to large heat loss through the substrate. Furthermore, the heat capacity in the layer within one thermal diffusion length $\mu$ from the DLC film should be minimized also: The temperature excursions in the film make themselves felt down to approximately this depth in the substrate. Thus, this layer increases the apparent heat capacity of the DLC film, reducing the temperature contrast during pulsing.

One material that fulfils the basic requirements defined above, is silica aerogel. It is a silicate network with hitch pore content, characterized by extremely low heat conductivity (typically down to 1.5 10exp(−4) [W/cm. K]), specific heat and —weight (down to 0.003 [g(cm3]). Thermal expansion and resistance to heat degradation are comparable to those of glass. The material is low cost and lends itself well to shaping and mounting in an emitter structure. The surface topography can be controlled over a wide ranges minimum feature size being defined by a pore size in the range 1 to 100 nm. Desired surface structures can, e.g. be made by mechanical processes such as machining, or by moulding during production of the aerogel.

The silica aerogel has a connected pore network. i.e. it can be used with an emitter film in a can which is either evacuated or filled with an inert gas. In the latter case, the aerogel substrate shall prevent convective heat loss by gas circulating past the back of the membrane, which is a potential loss mechanism with self-supporting membranes in a gas-filled can.

Since much of the heat conduction through aerogel is radiative, it is common to add IR absorbing material to the matrix. In the present case, this would enhance the emitter efficiency by re-radiation back into the DLC film, and could contribute to the emissivity of the latter.

A basic problem with self-supported membrane emitters in the thickness range from sub-micron to a few microns, is that even membrane materials that are usually considered opaque start to transmit infrared radiation when they become this thin, and their emissivity becomes low also. Even when suitable materials and processes exist, coating the membrane with a high-emissivity film adds complexity and cost, and may add too much to the heat capacity.

This problem is well-known from the design of infrared bolometer and has been studied in that connection (see, e.g. in Refs. 1,2,3) See, e.g., the following references: J. Clarke et al., "Superconductive bolometers for submillimeter wavelengths", J. Appl. Phys. 48, 4865 (1977); K. C. Liddiard, "Thin-film resistance bolometer IR detectors", Infrared Phys. 24, 57 (1984); M. Dragovan and S. H. Mosely, "Gold absorbing film for a composite bolometer", Appl. Opt. 23, 654 (1984). Another reference is D. H. Raguin and G. M. Morris, "Antireflection structured surfaces for the infrared spectral regions", Appl. Opt. 32, 1154 (1993). in Ref. 3, a dielectrial (diamond flake) was gold coated to an optimum electrical resistance per area to obtain high absorption. A broadband single pass absorptivity up to 50% is achievable by metallization, and considerably higher at selected wavelengths in resonant structures.

In commercial membrane emitters based on silicon, the electrical resistivity is controlled by doping (typically in the range 100 to 200 ohms per square in membrane) to obtain the optimal emissivity.

In the case of electrically conducting DLN films, it is possible to adjust the emissivity across a wide range by choosing metal atom concentration. This is an intrinsic feature to the film, and no further coating steps should be necessary.

The surface structure may profoundly affect the emissivity. Thus, a surface structure as shown in FIG. 5 enhances the broadband emissivity by:
  a) Cavity effect (compare: high absorption by multiple reflections of incident radiation)
  b) Antireflection effect (if structure details are smaller than the IR wavelength emitted, it acts as an index match between substrate and the surrounding air or vacuum, cf. Ref. 4).

Figure 5:
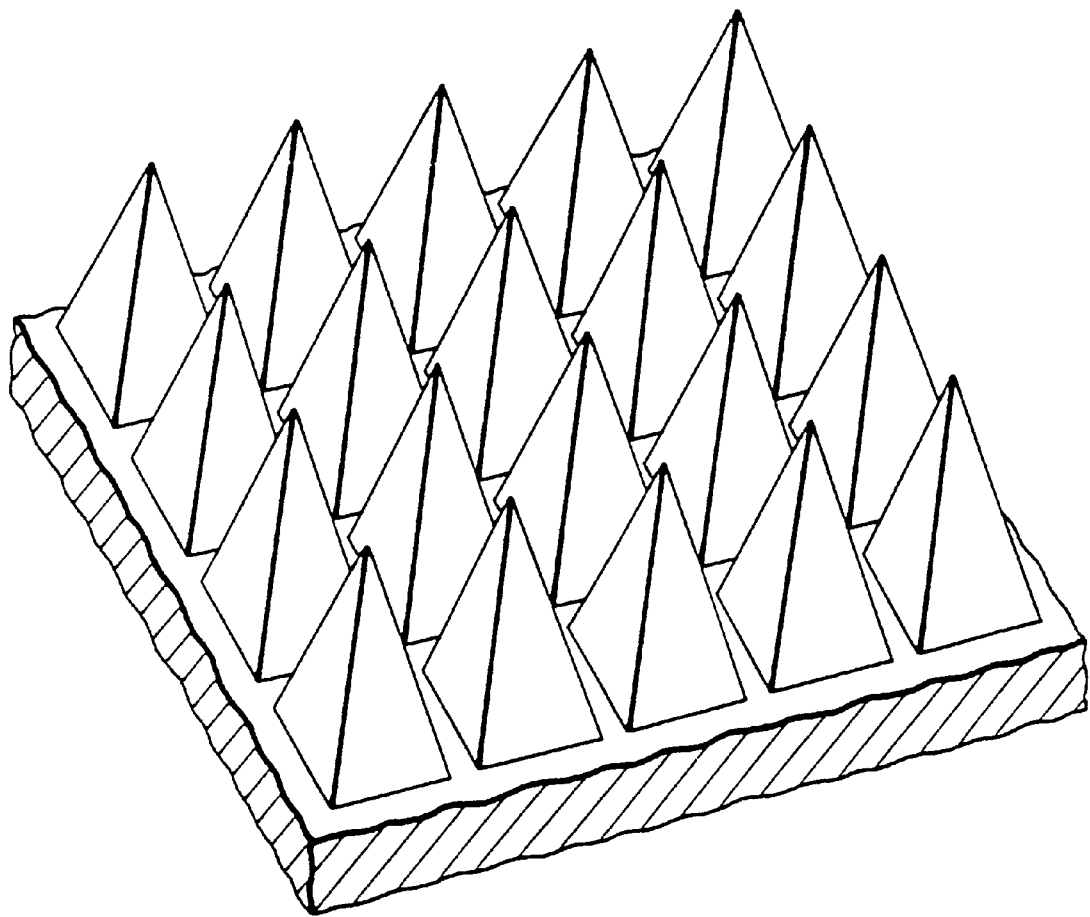

As is immediately apparent from the description of the preparation technique illustrated in FIG. 4, it may be advantageous to employ a substrate with microtexture, e.g. as shown in FIG. 5, to enhance the emissivity of the membrane emitter layer. This applies also in the case where the substrate is not removed following DLC deposition. For a wide range of substrate materials, e.g. polymers, the desired surface structure can be created by simple stamping or moulding. The DLC film deposition process and the thickness of the layers laid down shall generally be such that the film follows the substrate contour with high fidelity.

Figure 6A:
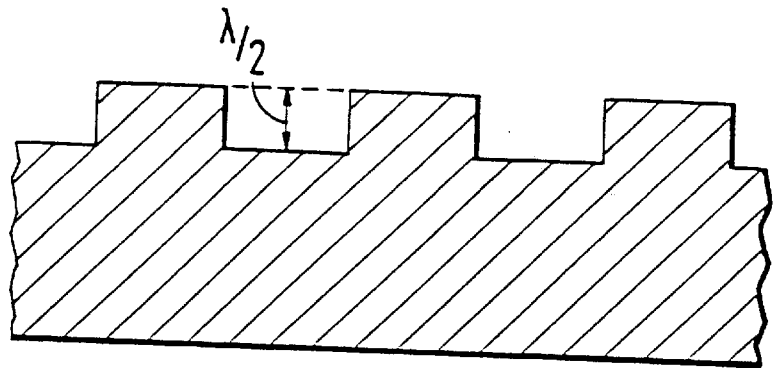

As described so far, the topographic surface structures serve to enhance the broadband emissivity of the surface. It is possible, however, to control the film's physical parameters so as to obtain enhanced emissivity at certain wavelengths. An example of this, applicable with emitter membranes of relatively low absorptivity (with or without a conductive coating on one side) is to choose the emitter thickness so as to take advantage of Fabry Perot resonances within (cf. e.g. Ref. 1). Due to the high degree of control during the deposition process DLC films should lend themselves well to such strategies. With membrane materials of high intrinsic absorption, however, the enhancement and spectral selectivity shall be modest, and one may consider the following alternative:

For a material with very high emissivity and with a surface topography as shown in FIG. 6a, one finds that the emitted radiation shall be enhanced at wavelengths yielding constructive interference between emission from top and bottom of the steps, provided that light is collected from a portion of the surface containing a large number of steps. While this idea is novel in the emission context, analogous effects are well known in connection with echelon gratings, where high wavelength selectivity is obtained.

Figure 6B:
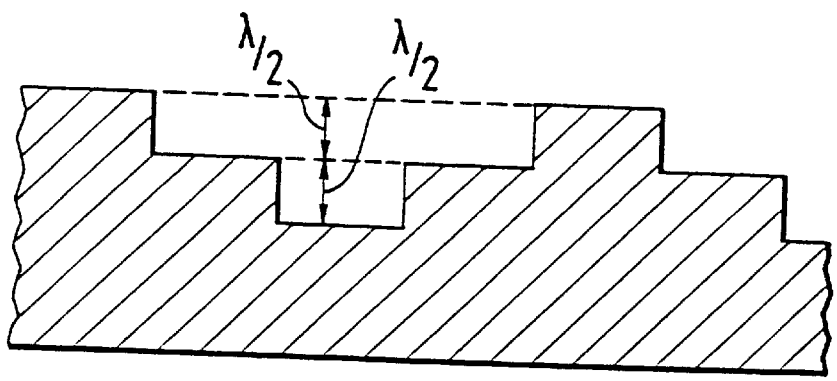

In order to physically make emitters exploiting this principle according to FIG. 6a, one can see that high aspect ratios must be achieved; i.e. deep, but narrow steps. This is generally difficult, even in the case of DLC deposition. An alternative structure that takes advantage of the equivalence of waves phase shifted by a multiple of $2\pi$, is shown in FIG. 6b. In this case, one must take into account possible sidebands created by the more coarse sub-structure. Instead of a binary structure, one may employ a multiple step height structure, etc. Thus, surface structuring provides a new dimension of freedom for tailoring the spectral emission characteristics of the emitter surface. Both with regards to design and manufacturing, one may expect synergy with diffractive optics technology which is currently evolving rapidly.

Figure 6C:
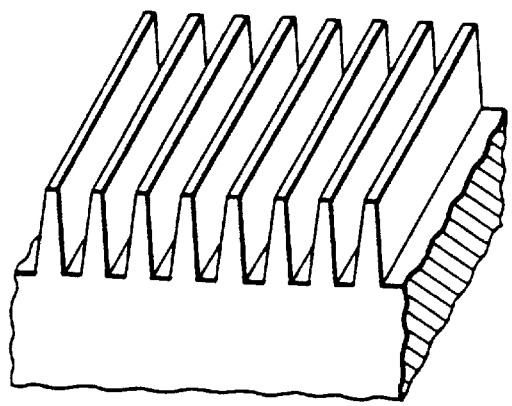

Going a step further, one may consider the structure shown in FIG. 6c, where the steps are elongated in one dimension, extending as parallel features across macroscopic portions of the emitter surface. As can be easily understood in cases where the top of each ridge is made highly electrically conducting (e.g. by skew metallization), the radiation from this surface shall have a high content of linear polarization. References:

We claim:

1. Infrared radiation source for sensor and spectroscopic applications comprising a thin, electrically conducting film adapted to emit infrared radiation on heating, wherein the film is formed from gas or vapour phase deposition, characterized in that the film comprises at least one network, the at least one network being a network of diamond-like carbon.

2. Infrared radiation source according to claim 1, characterized in that the film comprises metal atoms distributed as separate atoms in the diamond-like carbon network.

3. Infrared radiation source according to claim 2, characteized in that the metal atoms are selected among the elements tungsten, chromium and titanium.

4. Infrared radiation source according to claim 1, characterized in that the film comprises an additional network of silicon and oxygen.

5. Infrared radiation source according to claim 1, characterized in that the film is provided on a supporting substrate.

6. Infrared radiation source according to claim 5, characterized in that the supporting substrate is an aerogel.

7. Infrared radiation source according to claim 1, characterized in that the film is self-supporting.

8. Infrared radiation source according to claim 1, characterized in that the film has an electric resistance of between 50 and 400 ohm per square.

9. Infrared radiation source according to claim 1, characterized in that the surface of the film has been provided with an emission layer from gas or vapour phase deposition.

10. Infrared radiation source according to claim 1, characterized in that the film comprises two or more areas, each being connected with respective, separate electric driving electrodes.

11. Infrared radiation source comprising a thin, electrically conducting film according to claim 1 and adapted to emit infrared radiation upon being heated, wherein the film is formed from gas or vapour phase, characterized in that the surface of the film comprises topographic microstructures.

12. Infrared radiation source according to claim 11, characterized in that the microstructures are in the form of parallel grooves in the surface of the film.

13. Infrared radiation source according to claim 11, characterized in that the microstructures are in the form of a grid with two or more step levels or tiers.

14. Infrared radiation source according to claim 1, characterized in that the film comprises metal atoms forming an additional metallic network.

15. A method for fabricating an infrared radiation source according to claim 1, wherein the radiation source comprises a film the surface of which comprises topographic microstructures, characterized in depositing the film on a substrate, the surface of the substrate comprising topographic microstructures corresponding to those which are to be formed on the surface of the film, whereby the microstructures on the surface of the film are formed during the deposition of the film on the substrate.

16. A method for fabricating an infrared radiation source according to claim 15, characterized in that the topographic microstructures in the surface of the substrate are formed by stamping or moulding.

17. A method for fabricating an infrared radiation source according to claim 15, characterized in that the substrate is formed by a polymer.

18. A method for fabricating an infrared radiation source according to claim 15, characterized in that the film is deposited on a substrate which is removed after the deposition of the film.

19. A method for fabricating an infrared radiation source according to claim 18, characterized in that the substrate is formed by fluourcarbon which is removed by exposure to UV-radiation.

20. A method for fabrication of an infrared radiation source according to claim 18, characterized in that the substrate is formed by a polymethyl methacrylate (PMMA) polymer which is removed by heating.

21. A method for fabricating an infrared radiation source according to claim 18, characterized in that the substrate is removed after the deposition of the film by vaporization under influence of heat and subsequent sublimation.

22. A method for fabricating an infrared radiation source according to claim 18, characterized in that the substrate is removed after the deposition of the film by vaporization under influence of UV radiation and subsequent sublimation.

23. A method for fabricating an infrared radiation source according to claim 18, characterized in that the substrate is removed after the deposition of the film by being dissolved by exposure to chemical attack.

24. A method for fabricating an infrared radiation source according to claim 18, characterized in that the substrate is removed after the deposition of the film by being gassified by exposure to chemical attack.

25. A method for fabrication of an infrared radiation source according to claim 15, characterized in that electric feed conductors and a mechanical suspension means for the film are embedded in the substrate before the film is deposited.

* * * * *